(12) United States Patent
Vallieri et al.

US009701764B2

(10) Patent No.: US 9,701,764 B2
(45) Date of Patent: Jul. 11, 2017

(54) PROCESS FOR THE PREPARATION OF A COPOLYMER OF ETHYLENE

(71) Applicant: VERSALIS S.P.A., San Donato Milanese (IT)

(72) Inventors: Andrea Vallieri, Bologna (IT); Costantino Perretta, Ferrara (IT)

(73) Assignee: Versalis S.p.A., San Donato Milanese (IT)

( * ) Notice: Subject to any disclaimer, the term of this patent is extended or adjusted under 35 U.S.C. 154(b) by 190 days.

(21) Appl. No.: 14/356,248

(22) PCT Filed: Nov. 23, 2012

(86) PCT No.: PCT/IB2012/056679
§ 371 (c)(1),
(2) Date: May 5, 2014

(87) PCT Pub. No.: WO2013/076699
PCT Pub. Date: May 30, 2013

(65) Prior Publication Data
US 2014/0249282 A1    Sep. 4, 2014

(30) Foreign Application Priority Data

Nov. 25, 2011  (IT) .............................. MI2011A2155

(51) Int. Cl.
*C08F 4/68* (2006.01)
*C08F 210/16* (2006.01)
*C08F 210/18* (2006.01)

(52) U.S. Cl.
CPC .............. *C08F 4/68* (2013.01); *C08F 210/16* (2013.01); *C08F 210/18* (2013.01)

(58) Field of Classification Search
CPC ......... C08F 4/68; C08F 210/18; C08F 210/16
See application file for complete search history.

(56) References Cited

U.S. PATENT DOCUMENTS

| | | | |
|---|---|---|---|
| 3,337,422 A | 8/1967 | White | |
| 3,462,487 A | 8/1969 | Kinney et al. | |
| 4,278,506 A | 7/1981 | Irvin | |
| 4,634,751 A | 1/1987 | Best | |
| 4,657,997 A | 4/1987 | Best | |
| 5,480,850 A * | 1/1996 | Cann | C08F 10/00 502/103 |
| 5,919,877 A | 7/1999 | Tanaglia | |
| 6,486,278 B1 * | 11/2002 | Schiffino | C08F 210/18 502/117 |
| 2012/0053304 A1 * | 3/2012 | Fouarge | C08F 10/02 526/64 |

FOREIGN PATENT DOCUMENTS

EP     0967231 A1     12/1999

OTHER PUBLICATIONS

White Mineral Oil Basic Information (2009).*
International Search Report dated Mar. 15, 2013 for PCT/IB2012/056679.

* cited by examiner

*Primary Examiner* — Catherine S Branch
(74) *Attorney, Agent, or Firm* — Abel Law Group, LLP

(57) ABSTRACT

A process for the preparation of an elastomeric polymer of ethylene which comprises polymerizing, in suspension, a mixture of monomers comprising ethylene, at least one a-olefin having from 3 to 12 carbon atoms, possibly at least one non-conjugated diene having from 4 to 20 carbon atoms, in the presence of a catalytic system comprising: —a suspension in oil of at least one catalyst selected from compounds containing vanadium; —at least one co-catalyst, as such, selected from compounds containing aluminum; at least one activator, as such, selected from compounds containing chlorine.

18 Claims, No Drawings

PROCESS FOR THE PREPARATION OF A COPOLYMER OF ETHYLENE

The present invention relates to a process for the preparation of an elastomeric polymer of ethylene.

More specifically, the present invention relates to a process for the preparation of an elastomeric polymer of ethylene in the presence of a catalytic system comprising a suspension in oil of at least one catalyst selected from compounds containing vanadium, at least one co-catalyst as such, selected from compounds containing aluminium, at least one activator as such selected from compounds containing chlorine.

Processes for the preparation of elastomeric copolymers of ethylene are known in the art.

American U.S. Pat. No. 5,919,877, for example, describes a process for the polymerization of ethylene with α-olefins having from 3 to 10 carbon atoms, preferably propylene, and possibly with a non-conjugated diene, said process being effected in a suspension of liquid monomer in the presence of a catalyst containing vanadium and a co-catalyst essentially consisting of an organic compound of aluminium and possibly in the presence of a halogenated activator, characterized in that the above catalyst containing vanadium, insoluble in the reaction environment, is the precipitate obtained by mixing, in an inert atmosphere of ethylene or α-olefins:

(a) a vanadium compound in oxidation state 3 to 5;
(b) an essentially hydrocarbon solution of a compound selected from those having general formula $R_nAlX_m$ wherein R is a $C_1$-$C_{20}$ alkyl radical, X is a halogen, m+n=3, n is an integer ranging from 0 to 2.

The above process is said to be capable of giving elastomeric polymers of ethylene characterized by an improved morphology. Furthermore, the above process is said to be characterized by a substantial absence or in any case a considerable reduction in fouling of the polymerization reactor.

European patent application EP 967 231 describes a process for the preparation of an olefinic polymer, in particular, an ethylene-propylene-diene (EPDM) polymer, having a long-chain branching, comprising the step of polymerizing an olefinic monomer in the presence of a catalytic system comprising:

a catalyst comprising a compound containing vanadium with the proviso that said compound does not comprise a halogen directly bound to the vanadium;
a co-catalyst selected from organic compounds containing aluminium, having a molar ratio between halogen and aluminium ranging from about 1 to about 2;
an activator having formula (I):

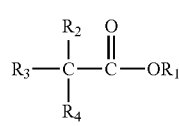

wherein:
$R_1$ is selected from the group comprising: $C_1$-$C_{10}$ alkyl groups, substituted or non-substituted; $C_5$-$C_{20}$ aryl groups, substituted or non-substituted; $C_3$-$C_{20}$ cycloalkyl groups, substituted or non-substituted; with the proviso that the group —C(O)OR$_1$ can be substituted with a derivative of carbonic acid, a keto group, or a nitrile group;

$R_2$, $R_3$ and $R_4$, equal to or different from each other, are selected from one of the following groups: (a) $R_1$; (b) halogen; and (c) hydrogen, a $C_1$-$C_{10}$ alkyl group, substituted or non-substituted; a $C_5$-$C_{20}$ aryl group, substituted or non-substituted; a $C_1$-$C_{10}$ alkoxyl group, substituted or non-substituted; a $C_5$-$C_{20}$ aryloxyl group, substituted or non-substituted, or a group —C(O)OR$_7$ wherein $R_7$ is a $C_1$-$C_{20}$ hydrocarbon group; with the proviso that:
(i) at least one of $R_2$, $R_3$ and $R_4$ is selected from group (b), and
(ii) in the activator having formula (I), all the following conditions are not satisfied: $R_1$ is a $C_1$-$C_6$ alkyl group, $R_2$ is a $C_1$-$C_6$ alkyl group or a $C_1$-$C_6$ alkoxyl group, $R_3$ is chlorine, bromine or hydrogen, and $R_4$ is chlorine or bromine.

In the above process, solutions in organic solvents of the catalyst, co-catalyst and activator, are used. In particular, the use is described of a solution in cyclohexane of an organic compound of aluminium (co-catalyst) [diethyl aluminium chloride (DEAC) or ethylaluminium sesquichloride (EASC)] and a solution in toluene of the catalyst (vanadium triacetylacetonate [V(acac)$_3$] and the activator [ethyl trichloro-acetate (ETA) or dichlorophenyl ethyl acetate (DC-PAE)].

The above process is said to be capable of giving olefinic polymers, in particular ethylene-propylene-diene (EPDM) polymers, having a high branching degree with a long chain, in particular when ethylaluminium sesquichloride (EASC)] is used as co-catalyst.

The above processes however have various drawbacks.

The pre-polymerized catalyst, for example, can have a lower catalytic activity and in any case require a further process step with prolonged production times and consequent higher production costs.

Furthermore, in particular when polymerization in suspension ("slurry polymerization") is effected, there can be the formation of gels and consequently the production of elastomeric polymers that cannot be used in many applications.

The use of solutions in organic solvents of the catalyst, co-catalyst and activator, moreover, can imply other drawbacks such as, for example, a specific selection of the organic solvents to be used which must be anhydrous as, in most cases, the co-catalysts [for example, diethyl aluminium chloride (DEAC)] can easily decompose in the presence of humidity and can be easily ignited; these organic solvents must therefore be separated from the polymer obtained and recovered at the end of the process. Furthermore, in order to remain within the law limits envisaged for polluting emissions, the recovery of said organic solvents often requires complicated and costly techniques which, however, do not always allow the desired results to be obtained.

The Applicant has therefore considered the problem of finding a process for the preparation of elastomeric polymers of ethylene, in suspension, capable of overcoming the above drawbacks. In particular, the Applicant, has considered the problem of finding a process for the preparation of elastomeric polymers of ethylene, in suspension, capable of being effected without solutions in organic solvents of the catalyst, co-catalyst and activator and reducing the formation of gels.

The Applicant has now found that the production of elastomeric polymers of ethylene in suspension can be advantageously effected using a catalytic system comprising a suspension in oil of at least one catalyst selected from compounds containing vanadium, at least one co-catalyst as such, selected from compounds containing aluminium, at least one activator as such selected from compounds containing chlorine. The use of said catalytic system allows elastomeric polymers to be obtained, having a reduced content of gels. Said elastomeric polymers of ethylene can be advantageously used in the production of extruded and/or expanded end-products. Furthermore, the use of said catalytic system in which there are no organic solvents present, allows the following advantages to be obtained:

- it avoids problems of toxicity for both the environment and for the health of the operators;
- it avoids the separation step of said solvents from the elastomeric polymer obtained at the end of the process and the consequent recovery step that imply a lengthening of the production times and consequently higher production costs.

An object of the present invention therefore relates to a process for the preparation of an elastomeric polymer of ethylene which comprises polymerizing, in suspension, a mixture of monomers comprising ethylene, at least one α-olefin having from 3 to 12 carbon atoms, possibly at least one non-conjugated diene having from 4 to 20 carbon atoms, in the presence of a catalytic system comprising:

- a suspension in oil of at least one catalyst selected from compounds containing vanadium;
- at least one co-catalyst, as such, selected from compounds containing aluminium;
- at least one activator, as such, selected from compounds containing chlorine.

For the purposes of the present description and following claims, the definitions of the numerical ranges always comprise the extremes unless otherwise specified.

For the purposes of the present description and following claims, the term "as such" means that the compound is used in the absence of organic solvents.

According to a preferred embodiment of the present invention, said α-olefin having from 3 to 12 carbon atoms can be selected, for example, from: propylene, 1-butene, iso-butene, 1-pentene, 1-hexene, 1-octene, styrene, α-methylstyrene; or mixtures thereof. Propylene is preferred.

According to a preferred embodiment of the present invention, said non-conjugated diene having from 4 to 20 carbon atoms can be selected, for example, from: linear non-conjugated dienes such as, for example, 1,4-hexadiene, 1,6-octadiene, or mixtures thereof; branched non-conjugated dienes such as, for example, 5-methylhexa-1,4-diene, 7-methylocta-1,6-diene, 7-methylocta-1,7-diene, or mixtures thereof; non-conjugated dienes containing an alicyclic ring such as, for example, 1,4-cyclohexadiene, 1,5-cyclooctadiene, or mixtures thereof; non-conjugated dienes containing several alicyclic rings, condensed or bridged such as, for example, tetrahydroindene, dicyclopentadiene (DCPD), 5-ethylidene-2-norbornene (ENB), 5-vinylidene-2-norbornene (VNB), 5-isopropylidene-2-norbornene, or mixtures thereof, or mixtures thereof. 5-ethylidene-2-norbornene (ENB) is preferred.

According to a preferred embodiment of the present invention, said elastomeric polymer of ethylene comprises:
(a) from 40% by weight to 80% by weight, preferably from 48% by weight to 77% by weight, of ethylene;
(b) from 20% by weight to 60% by weight, preferably from 25% by weight to 52% by weight, of at least one α-olefin;
(c) from 0% by weight to 15% by weight, preferably from 0% by weight to 12% by weight, of at least one non-conjugated diene;
the sum of (a)+(b)+(c) being equal to 100.

According to a preferred embodiment of the present invention, said oil can be selected from: paraffinic oil, naphthene oils, polybutene-based oils, polypropylene-based oils, or mixtures thereof. Paraffinic oil are preferred.

According to a preferred embodiment of the present invention, said catalyst can be present in said oil suspension in an amount ranging from 3% by weight to 20% by weight, preferably from 5% by weight to 15% by weight, with respect to the total weight of said suspension in oil.

According to a preferred embodiment of the present invention, said catalyst can be selected from vanadium compounds in oxidation state +3 to +5 such as, for example, vanadium halides, such as, for example, vanadium tetrachloride ($VCl_4$), vanadium trichloride ($VCl_3$), or mixtures thereof; vanadyl alkoxyhalides or vanadyl alkoxides having formula $VOCl_x(OR)_{3-x}$ wherein R represents a linear or branched $C_1$-$C_{20}$ alkyl group and x is an integer ranging from 0 to 3, such as, for example, vanadyl trichloride ($VOCl_3$), vanadyl triethoxyl [$VO(OEt)_3$], vanadyl dichlorobutoxyl [$VOCl_2(OBu)$], or mixtures thereof; vanadium or vanadyl acetylacetonates such as, for example, vanadium triacetylacetonate [$V(acac)_3$], vanadyl acetylacetonate [$VO(acac)_2$], vanadyl dichloroacetylacetonate [$VCl_2O(acac)$], or mixtures thereof; complexes between vanadium halides and Lewis bases such as, for example, $VCl_3 \cdot 2THF$ wherein THF is tetrahydrofuran; or mixtures thereof. Vanadium triacetylacetonate [$V(acac)_3$], vanadyl acetylacetonate [$VO(acac)_2$], are preferred.

According to a preferred embodiment of the present invention, said co-catalyst can be selected from compounds containing aluminium having general formula (I):

$$(R_1)_{3-n}AlY_n \qquad (I)$$

wherein:
- $R_1$ represents a linear or branched $C_1$-$C_{20}$ alkyl group;
- Y represents a halogen atom such as, for example, chlorine, bromine, fluorine, iodine, preferably chlorine; or a linear or branched $C_1$-$C_{20}$ alkoxyalkyl group;
- n represents an integer ranging from 0 to 2.

Specific examples of aluminium compounds having general formula (I) that can be advantageously used for the purposes of the present invention are: trimethyl aluminium, triethyl aluminium (TEA), triisobutyl aluminium, tridecyl aluminium, trioctyl aluminium, tridodecyl aluminium, diethyl aluminium methoxide, diethyl aluminium ethoxide, diethyl aluminium phenoxide, diethyl aluminium chloride (DEAC), ethyl aluminium dichloride, ethyl aluminium sesquichloride (EASC), methyl diethoxy aluminium, or mixtures thereof. Diethyl aluminium chloride (DEAC) is preferred.

According to a preferred embodiment of the present invention, the molar ratio between the aluminium present in the co-catalyst and the vanadium present in the catalyst can range from 1 to 200, preferably from 2 to 150.

According to a preferred embodiment of the present invention, said activator can be selected from compounds containing chlorine having general formula (II):

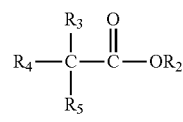

(II)

wherein:
R$_2$ represents a linear or branched C$_1$-C$_{20}$ alkyl group, optionally substituted; a C$_5$-C$_{20}$ aryl group, optionally substituted; a C$_3$-C$_{20}$ cycloalkyl group, optionally substituted; with the proviso that the group —C(O)OR$_2$ can be substituted with a derivative of carbonic acid, a keto group or a nitrile group;
R$_3$, R$_4$ and R$_5$, equal to or different from each other, are selected from: (a) R$_2$; (b) halogens such as, for example, chlorine, bromine, fluorine, iodine, preferably chlorine; (c) hydrogen; (d) linear or branched C$_1$-C$_{20}$ alkyl groups, optionally substituted; (e) C$_3$-C$_{20}$ cycloalkyl groups, optionally substituted; (f) C$_5$-C$_{20}$ aryl groups, optionally substituted; (g) C$_1$-C$_{20}$ alkyloxyl groups, optionally substituted; (h) C$_5$-C$_{20}$ aryloxyl groups, optionally substituted; (i) —C(O)OR$_6$ groups wherein R$_6$ is a C$_1$-C$_{20}$ hydrocarbon group; with the proviso that:
(i) at least one of R$_3$, R$_4$ and R$_5$ is selected from halogens (b), and
(ii) in the activator having formula (II), all the following conditions are not satisfied: R$_2$ is a C$_1$-C$_6$ alkyl group, R$_3$ is a C$_1$-C$_6$ alkyl group or a C$_1$-C$_6$ alkoxyl group, R$_4$ is chlorine, bromine or hydrogen, R$_5$ is chlorine or bromine.

Specific examples of compounds containing chlorine having general formula (II) that can be advantageously used for the purposes of the present invention are: ethyl trichloro-acetate (ETA), dichlorophenyl ethyl acetate (DCPAE), monochlorophenyl ethyl acetate (MCPAE), diethyl dichloromalonate, or mixtures thereof. Ethyl trichloro-acetate (ETA), dichlorophenyl ethyl acetate (DCPAE) are preferred.

According to a preferred embodiment of the present invention, the molar ratio between the activator and the vanadium present in the catalyst can range from 0.5 to 10, preferably from 1 to 8.

In order to regulate the molecular weight of the elastomeric polymer, said process can be carried out in the presence of a molecular-weight regulator.

According to a preferred embodiment of the present invention, said process can be carried out in the presence of at least one molecular-weight regulator selected, for example, from hydrogen, preferably gaseous hydrogen; or from compounds having general formula (III):

$$M(R_7)_n \qquad (III)$$

wherein:
M represents a metal selected from group 2 or group 12 of the Periodic Table of Elements such as, for example, beryllium, magnesium, calcium, strontium, barium, zinc, cadmium, mercury, preferably zinc;
R$_7$ represents a linear or branched C$_1$-C$_{12}$ alkyl group, such as, for example, methyl, ethyl, n-propyl, iso-propyl, n-butyl, t-butyl, n-hexyl, n-octyl, preferably ethyl;
n represents the valence number of the metal M.

Preferred molecular-weight regulators are gaseous hydrogen, diethyl zinc.

Said molecular-weight regulator can be used in a quantity and under operative conditions known in the art.

It should be pointed out that for the purposes of the present invention and following claims, the term "Periodic Table of Elements" refers to the "IUPAC Periodic Table of the Elements", version dated Jan. 21, 2011, indicated in the following Internet site: www.iupac.org/reports/periodic_table.

According to a preferred embodiment of the present invention, said process can be carried out at temperature ranging from 0° C. to 100° C., preferably from 10° C. to 50° C.

According to a preferred embodiment of the present invention, said process can be carried out at a pressure ranging from 0 bar to 50 bar, preferably ranging from 5 bar to 30 bar.

According to a preferred embodiment of the present invention, said process can be carried out for a time ranging from 10 minutes to 4 hours, preferably ranging from 20 minutes to 2 hours.

The above process in suspension can be carried out using an inert diluent as reaction medium, with the function of suspending agent, in which the elastomeric polymer of ethylene is substantially insoluble.

According to a preferred embodiment of the present invention, the above process can be carried out in a reaction medium prevalently comprising at least one α-olefin having from 3 to 12 carbon atoms, selected from those indicated above, preferably propylene, and at least one inert diluent such as, for example, propane, butane, pentane, or their isomers, or mixtures thereof, preferably propane.

The quantity of elastomeric polymer present in said reaction medium during the polymerization (i.e. total content of solids) preferably ranges from 0% by weight to 35% by weight, preferably from 10% by weight to 25% by weight, with respect to the total weight of the reaction medium.

The elastomeric polymer obtained can be recovered by operating according to techniques known in the art. Said elastomeric polymer, for example, can be recovered by means of the "Traditional Technology" which provides a first stripping section with steam (steam stripping) and a second water-removal section and drying, with the use of one or more extruders as described, for example, in American U.S. Pat. No. 3,337,422, U.S. Pat. No. 3,462,487 or U.S. Pat. No. 4,278,506.

Some illustrative and non-limiting examples are provided for a better understanding of the present invention and for its embodiment.

EXAMPLES

The characterization and analysis techniques listed hereunder were used:
Composition of the Elastomeric Polymer
The composition of the elastomeric polymer was determined by means of FTIR infrared spectroscopy ("Fourier Transform Infra Red"), using a method based on the standard ASTM D3900. For this purpose, a film of the elastomeric polymer was prepared by pressing at 150° C. and the relative spectra were registered.

The propylene content (weight %) was determined by integration of the absorption peaks at 720 cm$^{-1}$ and at 1155 cm$^{-1}$, and effecting the calculation using relations obtained empirically.

The content of 5-ethylidene-2-norbornene (ENB) (weight %) was determined by means of FTIR infrared spectroscopy ("Fourier Transform Infra Red"), using a method based on the standard ASTM D6047.
Viscosity of the Polymer
The Mooney viscosity (ML 1+4 @ 125° C.) was determined according to the standard ASTM D1646.

Examples 1-4

Two ethylene-propylene polymers and two ethylene-propylene-5-ethylidene-2-norbornene (ENB) polymers were prepared, operating as described hereunder.

The polymerization reaction in suspension, was carried out, in continuous, in a 40 l reactor, equipped with rotating blades, an anchor scraper and discharge from the bottom.

Said reactor was fed with:

liquid propane (inert diluent) (Lyondelbasell);

liquid propylene (monomer) (Polimeri Europa); gaseous ethylene (monomer) (Polimeri Europa); liquid 5-ethylidene-2-norbornene (ENB) (monomer) (Ineos); gaseous hydrogen (molecular-weight regulator) (Sapio);

a suspension of vanadium acetylacetonate V(acac)$_3$ (Reactana) in paraffinic oil (8% by weight of vanadium acetylacetonate with respect to the total weight of the suspension) (catalyst);

diethylaluminium chloride (DEAC) (as such; purity degree 98.5%; molar ratio Al/Cl: 1; Albemarle) (co-catalyst);

dichlorophenyl ethyl acetate (DCPAE) (as such; purity degree 97%; Chem Solutions) (activator).

Table 1 indicates the operative conditions used: feeding of the compounds to the reactor, temperature and pressure.

The average residence time of the compounds in the reactor was 1.5 hours. The suspension of elastomeric polymer obtained was discharged from the bottom of the reactor and sent, in continuous, to the strippers filled with water at 120° C., to which steam was also sent, thus obtaining the evaporation of the hydrogen, propane and non-reacted monomers (propylene and ethylene).

The non-reacted diethyl aluminium chloride (DEAC) and dichlorophenyl ethyl acetate (DCPAE), were also neutralized and decomposed in the above strippers, with a solution of sodium hydroxide (NaOH) and with the consequent formation of aluminium hydroxide/aluminium oxide [Al(OH)$_3$/Al$_2$O$_3$], acetic acid/acetic anhydride [CH$_3$COOH/(CH$_3$CO)$_2$O] and sodium chloride (NaCl).

The water leaving the strippers, which also contains traces of non-reacted vanadium, was collected and sent for water treatment.

The elastomeric polymer obtained was subjected to the characterizations described above and the results obtained are indicated in Table 1.

TABLE 1

| | Example 1 | Example 2 | Example 3 | Example 4 |
|---|---|---|---|---|
| Temperature (° C.) | 20.0 | 22.5 | 18.0 | 24.0 |
| Pressure (bar) | 10.0 | 10.0 | 9.5 | 10.5 |
| Propylene$^{(1)}$ (kg//h) | 6.4 | 11.2 | 5.6 | 10.8 |
| Propane$^{(2)}$ (kg/h) | 12.5 | 6.3 | 11.0 | 9.0 |
| Ethylene$^{(3)}$ (kg/h) | 0.80 | 0.35 | 0.60 | 0.50 |
| ENB$^{(4)}$ (ml/h) | — | — | 250.0 | 180.0 |
| Hydrogen$^{(5)}$ (g/h) | 2.80 | 0.20 | 2.34 | 0.02 |
| Purge$^{(6)}$ (kg/h) | 1.60 | 1.60 | 1.60 | 1.60 |
| V(acac)$_3$$^{(7)}$ (mmol/h) | 0.083 | 0.181 | 0.107 | 0.259 |
| DEAC$^{(8)}$ (mmol/h) | 7.45 | 10.85 | 9.65 | 7.75 |
| Molar ratio Al/V$^{(9)}$ | 90 | 60 | 90 | 30 |
| DCPAE$^{(10)}$ (mmol/h) | 0.50 | 1.0 | 0.53 | 1.53 |
| Molar ratio DCPAE/V$^{(12)}$ | 6 | 6 | 5 | 5 |
| Propylene Content (% by weight) | 29.5 | 49.0 | 35.0 | 40.0 |
| ENB content (% by weight) | — | — | 2.1 | 4.1 |
| Mooney Viscosity | 60.0 | 77.0 | 58.0 | 75.0 |

$^{(1)}$liquid propylene (monomer);
$^{(2)}$liquid propane (inert diluent);
$^{(3)}$gaseous ethylene (monomer);
$^{(4)}$liquid 5-ethylidene-2-norbornene (monomer);
$^{(5)}$gaseous hydrogen (molecular-weight regulator);
$^{(6)}$purge of the gas phase;
$^{(7)}$suspension of vanadium acetylacetonate V(acac)$_3$ in paraffinic oil (8% by weight of vanadium acetylacetonate with respect to the total weight of the suspension) (catalyst);
$^{(8)}$diethyl aluminium chloride (as such; degree of purity 98.5%) (co-catalyst);
$^{(9)}$molar ratio between the aluminium present in the co-catalyst and the vanadium present in the catalyst;
$^{(10)}$dichlorophenyl ethyl acetate (as such; degree of purity 97%) (activator);
$^{(11)}$molar ratio between the activator and vanadium present in the catalyst.

The invention claimed is:

1. A process for the preparation of an elastomeric polymer of ethylene which comprises polymerizing, in suspension, a mixture of monomers comprising ethylene, at least one α-olefin having from 3 to 12 carbon atoms, optionally at least one non-conjugated diene having from 4 to 20 carbon atoms, in the presence of a catalytic system comprising:
   an oil suspension of at least one catalyst selected from compounds containing vanadium;
   at least one co-catalyst in the absence of organic solvents, selected from compounds containing aluminium;
   at least one activator in the absence of organic solvents, selected from compounds containing chlorine.

2. The process for the preparation of an elastomeric polymer of ethylene according to claim 1, wherein said α-olefin having from 3 to 12 carbon atoms is selected from: propylene, 1-butene, iso-butene, 1-pentene, 1-hexene, 1-octene, styrene, α-methylstyrene; or mixtures thereof.

3. The process for the preparation of an elastomeric polymer of ethylene according to claim 1, wherein said non-conjugated diene having from 4 to 20 carbon atoms is selected from: linear non-conjugated dienes; branched non-conjugated dienes; non-conjugated dienes containing an alicyclic ring; non-conjugated dienes containing several alicyclic rings, condensed or bridged; and mixtures thereof.

4. The process for the preparation of an elastomeric polymer of ethylene according to claim 1, wherein said elastomeric polymer comprises:
   (a) from 40% by weight to 80% by weight of ethylene;
   (b) from 20% by weight to 60% by weight of at least one α-olefin;
   (c) from 0% by weight to 15% by weight of at least one non-conjugated diene;
   the sum of (a)+(b)+(c) being equal to 100.

5. The process for the preparation of an elastomeric polymer of ethylene according to claim 1, wherein said oil is selected from: paraffinic oil, naphthene oils, polybutene-based oils, polypropylene-based oils, or mixtures thereof.

6. The process for the preparation of an elastomeric polymer of ethylene according to claim 1, wherein said catalyst is present in said oil suspension in a catalytic amount ranging from 3% by weight to 20% by weight with respect to the total weight of said oil suspension.

7. The process for the preparation of an elastomeric polymer of ethylene according to claim 1, wherein said catalyst is selected from vanadium compounds in oxidation state +3 to +5; vanadyl alkoxyhalides or vanadyl alkoxides having formula VOCl$_x$(OR)$_{3-x}$ wherein R represents a linear or branched C$_1$-C$_{20}$ alkyl group and x is an integer ranging from 0 to 3; vanadium and vanadyl acetylacetonates; complexes between vanadium halides and Lewis bases; or mixtures thereof.

8. The process for the preparation of an elastomeric polymer of ethylene according to claim 7, wherein said catalyst is selected from vanadium triacetylacetonate [V(acac)$_3$] and vanadyl acetylacetonate [VO(acac)$_2$].

9. The process for the preparation of an elastomeric polymer of ethylene according to claim 1, wherein said co-catalyst is selected from compounds containing aluminium having general formula (I):

$$(R_1)_{3-n}AlY_n \qquad (I)$$

wherein:
$R_1$ represents a linear or branched $C_1$-$C_{20}$ alkyl group;
Y represents a halogen atom; or a linear or branched $C_1$-$C_{20}$ alkoxyalkyl group;
n represents an integer ranging from 0 to 2.

10. The process for the preparation of an elastomeric polymer of ethylene according to claim 9, wherein said co-catalyst is diethyl aluminium chloride (DEAC).

11. The process for the preparation of an elastomeric polymer of ethylene according to claim 1, wherein the molar ratio between the aluminium present in the co-catalyst and the vanadium present in the catalyst ranges from 1 to 200.

12. The process for the preparation of an elastomeric polymer of ethylene according to claim 1, wherein said activator is selected from compounds containing chlorine having general formula (II):

(II)

wherein:
$R_2$ represents a linear or branched $C_1$-$C_{20}$ alkyl group, optionally substituted; a $C_5$-$C_{20}$ aryl group, optionally substituted; a $C_3$-$C_{20}$ cycloalkyl group, optionally substituted; with the proviso that the group —C(O)OR$_2$ can be substituted with a derivative of carbonic acid, a keto group or a nitrile group;
$R_3$, $R_4$ and $R_5$, the same or different, are selected from: (a) $R_2$; (b) halogens; (c) hydrogen; (d) linear or branched $C_1$-$C_{20}$ alkyl groups, optionally substituted; (e) $C_3$-$C_{20}$ cycloalkyl groups, optionally substituted; (f) $C_5$-$C_{20}$ aryl groups, optionally substituted; (g) $C_1$-$C_{20}$ alkyloxyl groups, optionally substituted; (h) $C_5$-$C_{20}$ aryloxyl groups, optionally substituted; (i) —C(O)OR$_6$ groups wherein R$_6$ is a $C_1$-$C_{20}$ hydrocarbon group; with the proviso that:
(i) at least one of $R_3$, $R_4$ and $R_5$ is selected from halogens, and
(ii) in the activator having formula (II), all the following conditions are not satisfied: $R_2$ is a $C_1$-$C_6$ alkyl group, $R_3$ is a $C_1$-$C_6$ alkyl group or a $C_1$-$C_6$ alkoxyl group, $R_4$ is chlorine, bromine or hydrogen, $R_5$ is chlorine or bromine.

13. The process for the preparation of an elastomeric polymer of ethylene according to claim 12, wherein said activator is ethyl trichloride acetate (ETA) or dichlorophenyl ethyl acetate (DCPAE).

14. The process for the preparation of an elastomeric polymer of ethylene according to claim 1, wherein the molar ratio between the activator and the vanadium present in the catalyst ranges from 0.5 to 10.

15. The process for the preparation of an elastomeric polymer of ethylene according to claim 1, wherein said process is carried out in the presence of at least one molecular weight regulator selected from hydrogen, or from compounds having general formula (III):

$$M(R_7)_n \qquad (III)$$

wherein:
M represents a metal selected from group 2 or group 12 of the Periodic Table of Elements;
$R_7$ represents a linear or branched $C_1$-$C_{12}$ alkyl group;
n represents the valence number of the metal M.

16. The process for the preparation of an elastomeric polymer of ethylene according to claim 1, wherein said process is carried out at a temperature ranging from 0° C. to 100° C.

17. The process for the preparation of an elastomeric polymer of ethylene according to claim 1, wherein said process is carried out at a pressure ranging from 0 bar to 50 bar.

18. The process for the preparation of an elastomeric polymer of ethylene according to claim 1, wherein said process is carried out for a time ranging from 10 minutes to 4 hours.

* * * * *